US008027858B2

(12) United States Patent
Aleksiejczyk et al.

(10) Patent No.: US 8,027,858 B2
(45) Date of Patent: Sep. 27, 2011

(54) CYCLE PLANNING TOOL FOR TERRITORY MANAGEMENT

(75) Inventors: Kim Aleksiejczyk, Wilton, CT (US);
Mietek Ciszkowski, Milford, CT (US);
Sayee Natarajan, Norwalk, CT (US);
Jake Stahl, Milford, CT (US);
Ramachandran Subramanian,
Norwalk, CT (US)

(73) Assignee: Purdue Pharma L.P., Stamford, CT (US)

( * ) Notice: Subject to any disclaimer, the term of this patent is extended or adjusted under 35 U.S.C. 154(b) by 237 days.

(21) Appl. No.: 11/925,565

(22) Filed: Oct. 26, 2007

(65) Prior Publication Data

US 2008/0103870 A1    May 1, 2008

Related U.S. Application Data

(60) Provisional application No. 60/868,015, filed on Nov. 30, 2006, provisional application No. 60/863,243, filed on Oct. 27, 2006.

(51) Int. Cl.
*G06Q 10/00* (2006.01)
*G06F 17/30* (2006.01)
*G06F 17/40* (2006.01)

(52) U.S. Cl. ..................................... 705/7.12
(58) Field of Classification Search .......... 705/9
See application file for complete search history.

(56) References Cited

U.S. PATENT DOCUMENTS

| | | | |
|---|---|---|---|
| 5,644,722 A * | 7/1997 | Miyamoto et al. | 705/9 |
| 6,012,037 A * | 1/2000 | Yoshikawa | 705/7.24 |
| 6,272,074 B1 * | 8/2001 | Winner | 368/10 |
| 6,327,570 B1 | 12/2001 | Stevens | |
| 2002/0173990 A1 | 11/2002 | Marasco | |
| 2003/0135402 A1 | 7/2003 | Moore | |
| 2005/0125273 A1 * | 6/2005 | Simons et al. | 705/8 |
| 2005/0222886 A1 | 10/2005 | Sridharan | |
| 2006/0026051 A1 | 2/2006 | Rose | |
| 2006/0116918 A1 | 6/2006 | Flora et al. | |
| 2006/0293930 A1 | 12/2006 | Rodgers et al. | |
| 2007/0185744 A1 * | 8/2007 | Robertson | 705/5 |

FOREIGN PATENT DOCUMENTS

WO    WO-2007/002280    1/2007

OTHER PUBLICATIONS

Tullio, J., et al.; Augmenting Shared Personal Calendars; Oct. 27-30, 2002; UIST '02; ACM, vol. 4, Issue 2; pp. 11-20.*
U.S. Appl. No. 11/925,512, Kim Aleksiejczyk, et al.
U.S. Appl. No. 11/925,552, Mietek Ciszkowski, et al.

* cited by examiner

*Primary Examiner* — Susanna M Meinecke Diaz
*Assistant Examiner* — Ashley Chou
(74) *Attorney, Agent, or Firm* — Leason Ellis LLP (57) ABSTRACT

Electronically creating a schedule plan of events which replicates one or more previously scheduled events. A source date range is acquired into a memory of a machine. A set of previously scheduled events within the source date range is identified. A target date range is received through a user interface. At least a portion of the previously scheduled events is assigned to a date within the received target date range to create the schedule plan. The schedule plan is posted to a calendar. Another method creates a schedule plan on the basis of one or more search criteria used for identifying any match from a database. At least a portion of any matches are assigned a time slot within a target date range of a calendar program.

17 Claims, 8 Drawing Sheets

Cycle Planner

Source Dates 09/24/2006 — 232

Target Start Date 11/19/2006   09/29/2006 — 234

Scheduling Method ⊙ Maintain Day of Week   ○ Split Schedule   ○ Split Schedule/Maintain Day of Week} 242

[Refresh] [Schedule] [Back]
         238      240

230

| Calendar Date 19-NOV-2006 📅 Go | Week Range: From 19-NOV-06 To 24-NOV-06 | | | | | |
|---|---|---|---|---|---|---|
| Sunday | Monday | Tuesday | Wednesday | Thursday | Friday | |
| | Sue; Time 8:00 AM-9:30 AM Sparks,NV,89431 | Betty; Time 9:00 AM-10:30 AM Carson City,NV,89675 | Guy; Time 2:00 PM-3:30 PM Sparks,NV,89431 | HOLIDAY Sam; Time 11:00 AM-11:30 AM Lander,NV,86543 | HOLIDAY Todd; Time 8:00 AM-9:30 AM Nye,NV,89222 | |
| | Dan; Time 12:00 PM-3:30 PM Sparks,NV,89431 | Stan; Time 1:00 PM-4:30 PM Carson City,NV,89675 | | Dave; Time 12:00 AM-12:30 AM Lander,NV,86543 | Ann; Time 1:00 PM-1:30 PM Nye,NV,89222 | |
| | | Lou; Time 5:00 PM-5:30 PM Carson City,NV,89675 | | | Jim; Time 3:00 PM-4:30 PM Nye,NV,89222 | |

244

| Calendar Date 26-NOV-2006 📅 Go | Week Range: From 26-NOV-06 To 01-DEC-06 | | | | | |
|---|---|---|---|---|---|---|
| Sunday | Monday | Tuesday | Wednesday | Thursday | Friday | |

Cycle Planner

Source Dates 09/24/2006 📅 09/29/2006 📅

Target Start Date 11/19/2006 📅

Scheduling Method ○ Maintain Day of Week ● Split Schedule ○ Split Schedule/Maintain Day of Week } 242

[Refresh] [Schedule] [Back]

Calender Date 19-NOV-2006 📅 (Go) Week Range: From 19-NOV-06 To 24-NOV-06

| Sunday | Monday | Tuesday | Wednesday | Thursday | Friday |
|---|---|---|---|---|---|
| | Sue; Time 8:00 AM-9:30 AM Sparks,NV,89431<br><br>Dan; Time 12:00 PM-3:30 PM Sparks,NV,89431 | Betty; Time 9:00 AM-10:30 AM Carson City,NV,89675<br><br>Stan; Time 1:00 PM-4:30 PM Carson City,NV,89675<br><br>Lou; Time 5:00 PM-5:30 PM CarsonCity,NV,89675 | Guy; Time 2:00 PM-3:30 PM Sparks,NV,89431 | Holiday | Holiday |

Calender Date 26-NOV-2006 📅 (Go) Week Range: From 26-NOV-06 To 01-DEC-06

| Sunday | Monday | Tuesday | Wednesday | Thursday | Friday |
|---|---|---|---|---|---|
| | Sam; Time 11:00 AM-11:30 AM Lander,NV,86543<br><br>Dave; Time 12:00 AM-12:30 AM Lander,NV,86543 | Todd; Time 8:00 AM-9:30 AM Nye,NV,89222<br><br>Ann; Time 1:00 PM-1:30 PM Nye,NV,89222<br><br>Jim; Time 3:00 PM-4:30 PM Nye,NV,89222 | | | |

Cycle Planner

250

Source Dates 09/24/2006 📅 09/29/2006 📅

Target Start Date 11/19/2006 📅     Refresh   Schedule   Back

Scheduling Method ⦿ Maintain Day of Week  ○ Split Schedule  ○ Split Schedule/Maintain Day of Week  } 242

Week Cycle     Exclude Dates

| Include? | Name | Specialty | Call Date | Street,City,State,Zip | Week Cycle | On Itinerary | Start Date | Start Time | End Time | Activity |
|---|---|---|---|---|---|---|---|---|---|---|
| ☑ | Sue | NPR | 09/25/2006 | Sparks,NV 89434 | - | NO | 11/19/2006 📅 | 9:00 AM ▾ | 5:00 PM ▾ | Appointment ▾ |
| ☑ | Dan | IM | 09/25/2006 | Carson City,NV 89706 | - | YES | 11/19/2006 📅 | 9:30 AM ▾ | 10:00 AM ▾ | Drop-In ▾ |
| ☑ | Betty | NPR | 09/26/2006 | Carson City,NV 89706 | - | YES | 11/21/2006 📅 | 9:00 AM ▾ | 10:30 AM ▾ | Drop-In ▾ |
| ☑ | Stan | IM | 09/26/2006 | Carson City,NV 89706 | - | YES | 11/21/2006 📅 | 1:00 PM ▾ | 4:30 PM ▾ | Drop-In ▾ |
| ☑ | Lou | IM | 09/26/2006 | Carson City,NV 89706 | - | YES | 11/21/2006 📅 | 5:00 PM ▾ | 5:30 PM ▾ | Drop-In ▾ |
| ☑ | Guy | NPR | 09/27/2006 | Sparks,NV 89434 | - | YES | 11/22/2006 📅 | 2:00 PM ▾ | 3:30 PM ▾ | Drop-In ▾ |

252

Figure 3 (Amended)

Fig. 4
(AMENDED)

CYCLE PLANNING TOOL FOR TERRITORY MANAGEMENT

This patent application claims the benefit of priority under 35 U.S.C. §119(e) of U.S. Provisional Application Ser. No. 60/868,015, filed Nov. 30, 2006, entitled "Cycle Planning Tool For Territory Management, and of U.S. Provisional Application Ser. No. 60/863,243, filed Oct. 27, 2006, entitled "Territory Management System," which are hereby incorporated by reference in their respective entireties.

FIELD OF THE INVENTION

The present invention relates to tools for the creation of a schedule plan for field representatives of manufacturers and service providers, and, more particularly, to software, systems and methodologies that assist in the scheduling of future events based on past events and customer data.

BACKGROUND OF THE INVENTION

Manufacturers and service providers often employ field representatives to assist in the sales and marketing of goods and services. In order to provide these services, representatives are required to engage in direct customer contact. This contact enables the field representative to, among other things, establish a relationship with the customer, provide product education and obtain consumer feedback. On the other hand, it requires careful management of time to ensure coverage of the representative's territory.

In addition to ensuring time for contacts with customers in the territory, it is important for the field representative to maximize the quality of the contacts made while in that geographic locale. Likewise, establishing a schedule plan that provides an efficient daily schedule in terms of time required to travel from one meeting to another, or to match the schedule preferences of the customer in order to increase the potential that a series of sales calls will result in an increased number of successful customer contacts is a problem not adequately addressed in the art. The present invention addresses one or more of these needs and others.

SUMMARY OF THE INVENTION

In accordance with one aspect of the invention, a computer-assisted method for electronically creating a schedule plan of events is described. The method replicates a set of previously scheduled events. A source date range is acquired into a memory of a machine. A set of previously scheduled events within the source date range is identified. A target date range is received through a user interface. At least a portion of the previously scheduled events is assigned to a date within the received target date range to create the schedule plan. The schedule plan is posted to a calendar maintained by the machine.

The set of previously scheduled events is preferably comprises all events on a prior calendar day or week, but typically comprises two or more events on one or more calendar days.

In accordance with further aspects of the foregoing method, the target date range can be tested for any conflict. In the absence of any conflict, the assigning step can then be performed. In the event of a conflict, however, further steps can be performed which the schedule of events by assigning a second portion of the previously scheduled events to a date that is outside of the received target date range.

In accordance with another aspect of the invention, a computer-assisted method for electronically creating a schedule plan of events is described. The method and creates a schedule plan of events. One or more search criteria are acquired into a memory of a machine. A target date range is received through a user interface. A search of a database is executed to identify at least one criterion match. At least a portion of any matches are assigned in the memory to a time slot of a date that is within the received target date range. The target date range of a calendar program is then populated with the memory assignments.

These and other aspects, features and advantages of the invention are described in connection with certain embodiments and the accompanying drawing figures.

DETAILED DESCRIPTION OF CERTAIN EMBODIMENTS

By way of overview and introduction, representatives can be provided with a tool for conducting their activities in an efficient manner, and, in particular, for scheduling field events, such as visits with health care professionals ("HCPs") or other customers of the representative.

The scheduling tool can be part of a territory management system, preferably implemented as a software-based system having components executing on a number of systems including a central computer and a multiplicity of remote machines. Each representative can have a remote machine for his or her personal use and for forwarding customer data or scheduling information to a location associated with or accessible by the central computer. Without loss of generality, the present invention is described in relation to a particular representative using a single remote machine in the course of his or her activities covering an assigned territory. In the preferred embodiment described below, the representative is bespoke or contracted to a pharmaceutical manufacturer, and the representative "covers" a territory through visits to physicians and nurses (more generally, "prescribers") at which the representative is able to discuss and promote the use of the manufacturer's products.

The remote machine used by the representative includes a suitable complement of hardware and software including, by way of example, a processor, memory, an accessible database, communications equipment, and input/output devices.

A preferred software tool for territory management is described in the U.S. provisional application Ser. No. 60/863,243, filed Oct. 27, 2006. The Territory Management System software provides through a Web-browser interface a number of tools that assist the representative in planning, recording, and tracking activities with customers such as prescribers. In relevant part, the territory management system assists in scheduling site visits to HCPs or other customers by providing calendar functions, as shown, for example, in FIG. 2A. The calendar program is integral to the territory management software, but can provide integration with third-party software through two-way compatible data exchange. For example, entries can be exported to, or imported from, an external calendar program using a suitable data format. The Territory Management System software also includes features that assist a representative with compliance issues concerning certain state or federal requirements (e.g., limits and restrictions concerning expenditures on health care professionals), and can assist in reducing discrepancies in sample inventories as between stored and on-hand inventories. Various features of the Territory Management System software are described in certain provisional patent applications, which are also now co-pending and are referenced below to the extent they have pertinence to the discussion of the present invention.

In the area of pharmaceutical representation, it is common for a representative to drop-in on a prescriber within the representative's assigned territory with the hope that the prescriber will be able to speak with the representative for a few minutes. The nature of such visits can vary from informal to formal, but one objective of the representative is to promote a prescriber's familiarity and understanding of certain pharmaceuticals. In other fields, the representative similarly has an objective of promoting his or her represented products and services through educational and promotional efforts. A scheduled entry only results in an actual "call note," which records the visit in the local database of the machine, if the representative actually meets with the HCP or other customer. The representative typically schedules a number of site visits during the course of a day to various customer offices, whether scheduled as an appointment or drop-in, and these visits can be arranged using the tools described herein or using additional calendar functions as described in U.S. Provisional Application Ser. No. 60/868,027, filed Nov. 30, 2006, entitled "Itinerary Search Tool for Territory Management," which is hereby incorporated by reference in its entirety. When a conference is actually held with a customer, the representative creates a "call note" which is recorded in the local database of the representative's machine and which documents who was met, what products (services) were discussed, whether samples were provided (and details concerning same), whether any adverse event information was discussed.

A field representative plans a future schedule of events, within his or her assigned territory, with the desire to achieve a number of visits in any given day with a degree of efficiency and effectiveness. A "cycle" Refers to a window of time that has been or is to be populated with events. In one approach, a schedule of future events is planned by replicating existing events from prior cycles. This is referred to as "cycle planning." Cycle planning also includes identifying a criterion or several criteria that can propose events for a future cycle. The field representative can plan future events on a weekly, monthly, quarterly, semi-annual or yearly basis. Additionally, the representative can plan a schedule of future events for a single day or a fraction of a day.

There are many reasons why a field representative may want to replicate a previously scheduled set of events. It may be that the prescriber is not available for a conference with the representative, in which case the representative proceeds to a next appointment by traveling to another site within his or her territory, but wants to recapture the calendared set of appointments that filled that day. Alternatively, the set of scheduled of sales calls can result in a particularly successful day (in terms of call notes entered into the local database based on actual meetings conducted with customers), and the field representative may want to reproduce that schedule on a future date. To facilitate scheduling follow-up visits, the field representative can implement methods as described below to populate his or her calendar with schedule events.

Figure 1:
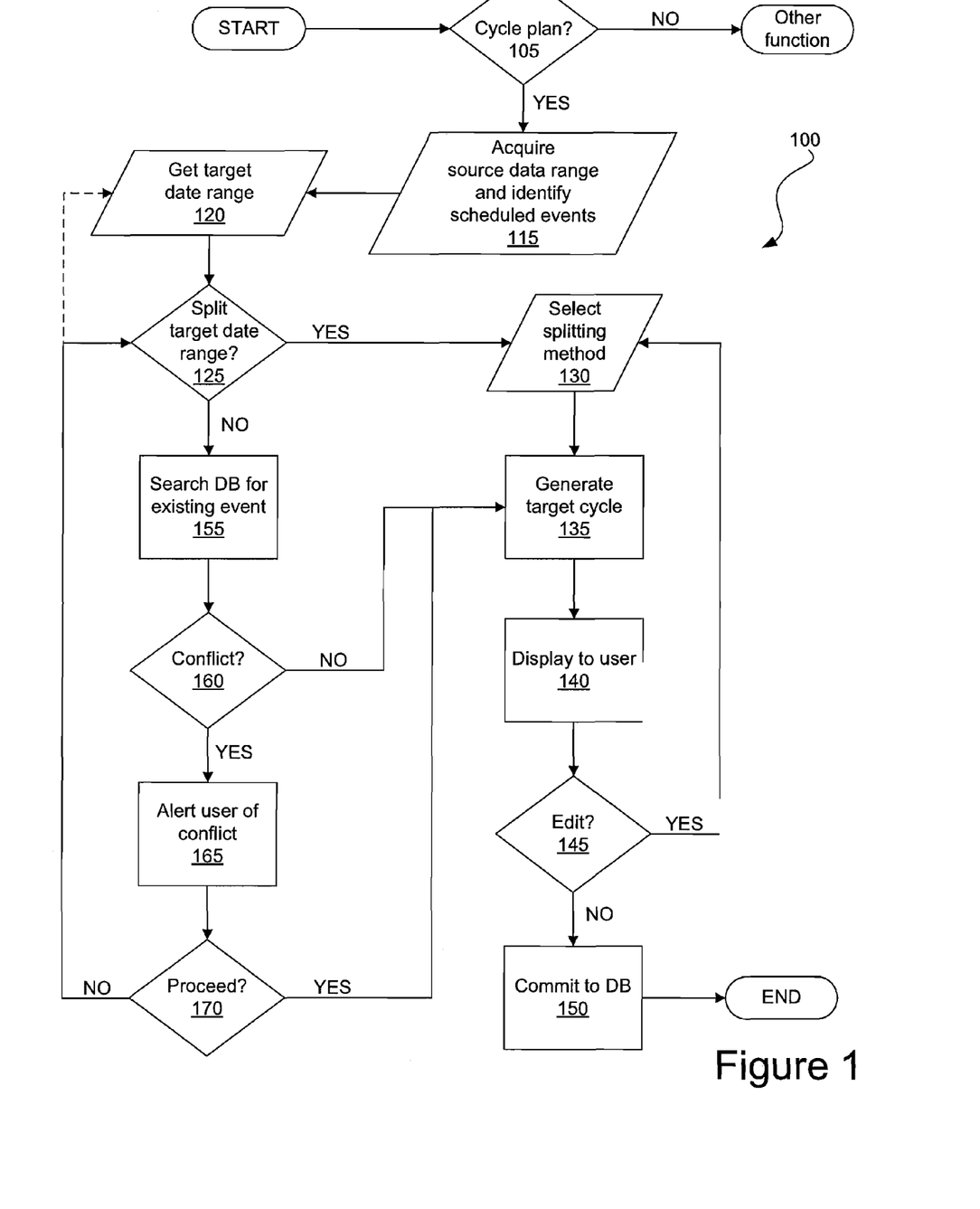
FIG. 1 is a flow diagram illustrating certain steps, in accordance with one embodiment of the invention, relating to the creation of a schedule plan based on previously scheduled events.
Figure 2A:
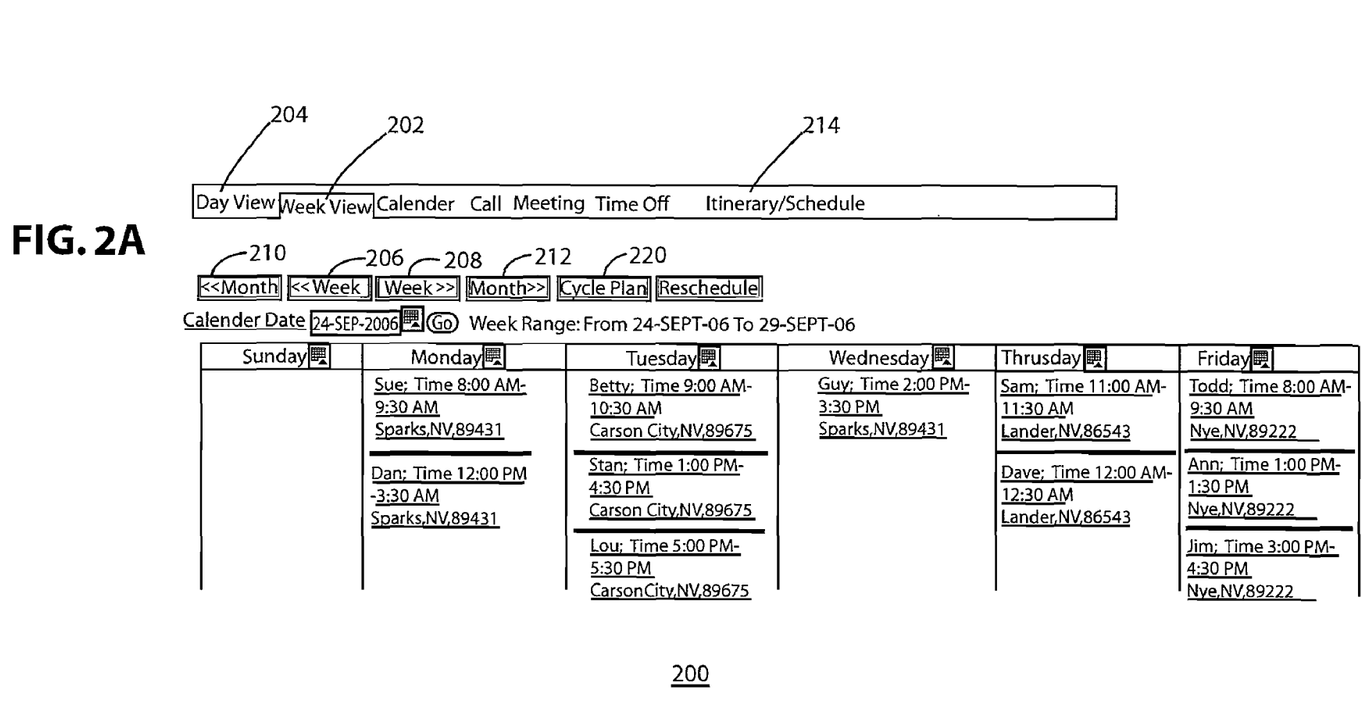
FIG. 2A is a sample one-week view of a user calendar, displayed through the user interface of a machine.

Referring now to FIG. 1, a flow diagram illustrates functionality suitable for electronically scheduling a series of future events, based on a previously scheduled set of events. The process 100 may be initiated at any time during an active user session, for example from a source calendar view 200 as shown in FIG. 2A. In FIG. 2A, a week view is presented, as can be made available by selecting tab 202. A day view is selectable using tab 204. Cycle planning commences at block 105 at which point the representative chooses to plan a set of future events. In the process flow 100, planning is based on a set of events, such as may be viewed in the calendar of the representative, provided by the territory system. If the user does not wish to cycle plan they may choose another function such as those related to expense reporting, sample inventory control or adverse-event data capture, management and reporting as described in the following applications: U.S. Provisional Application Ser. No. 60/867,906, filed on Nov. 30, 2006, entitled "Pharmaceutical Representative Expense Report Management Software, Systems, And Methodologies," U.S. Provisional Application Ser. No. 60/867,903, filed on Nov. 30, 2006, entitled "Inventory Control Over Pharmaceutical Sample Distributions Software, Systems And Methodologies," and U.S. Provisional Application Ser. No. 60/867,923, filed on Nov. 30, 2006, entitled "Adverse Event Data Capture Software, Systems, And Methodologies", which are each hereby incorporated by reference in their respective entireties.

An exemplary one-week calendar view 200 is shown in FIG. 2A for the week of Sep. 24 through Sep. 29, 2006. Other weeks can be selected through conventional navigation using buttons 206, 208 to scroll to prior or later weeks, and buttons 210, 212 to scroll to prior or later months. In the illustrated week, a number of appointments within the state of Nevada are included for each of the weekdays. When a desired view is presented in the source window 200, the representative can initiate the cycle plan functionality by selecting the Cycle Plan button 220, as indicated at bloc, 105 of FIG. 1.

The user is presented with a graphic display that includes the beginning source date, the ending source date, and the beginning target date text box 232. Each of the source and the target date displays can be accompanied by a calendar icon. The calendar icons are selected by the user in order to change the displayed dates. The user can be provided with a pop-up calendar to assist in selecting the date range.

By choosing cycle plan from an active calendar window 200, the date or date range within that view can be acquired as the default value of the source date range for use in cycle planning, subject to change by the representative. The database of the machine is then searched to identify the previously scheduled events within the source date range. Optionally, events in certain categories can be automatically filtered out, such as any personal entries. Both the source date range, and the identified events falling within that range, are loaded into the memory of the machine at 115.

Figure 2B:
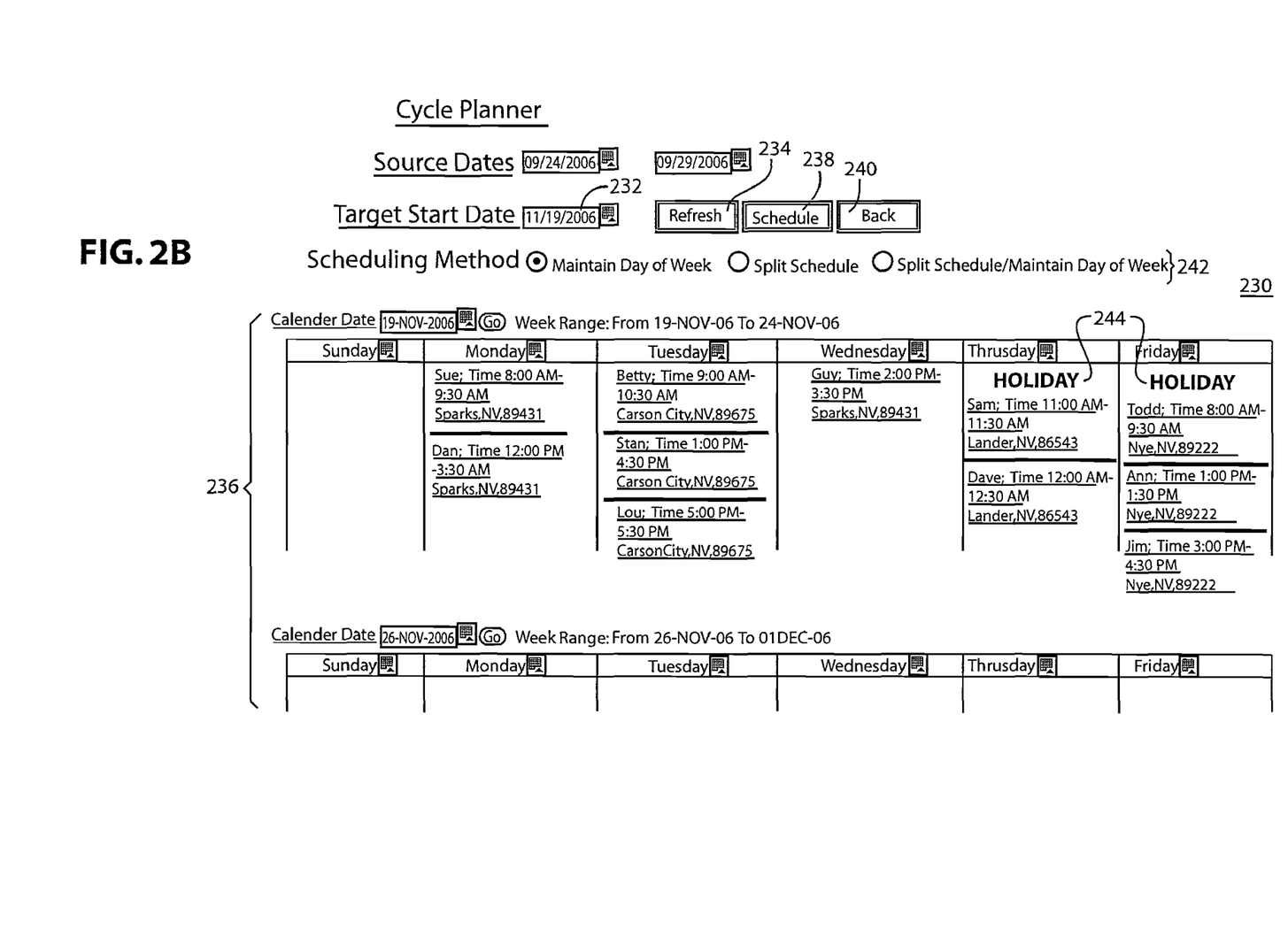
FIG. 2B is a sample two-week view of a user calendar after cycle planning using a "Maintain Day of Week" option, displayed through the user interface of the machine.

Selection of the cycle plan button 220 causes the source window 200 to be refreshed or replaced. FIG. 2B illustrates a first target view 230 in which the user has entered a start date for the target range, "Nov. 19, 2006," in text box 232, in response to a prompt, as indicated at block 120. The target date range represents the future time in which the representative wishes to replicate the events from his or her calendar. The target date range can be obtained from the user by receiving both a beginning and ending target date, or the user can supply only the beginning target date (as shown). In the latter case, the ending target date for the target date range is determined by adding to the beginning target date the same number of days that comprise the source date range. The target date range can be entered by the user in either a textual or graphic format. The user can be provided with a pop-up calendar to assist in the selection of the target date range. The target date range, so input, is stored in the memory of the machine.

After obtaining and storing the target date range in the memory of the machine, a set of replicated events can be presented in the target view 230, directly, or in response to interacting with a control feature such as a refresh button 234. The replicated events appear in a region 236 which looks like an existing calendar view, except that this region is a presentation of the workspace used by the territory management system to plan the future cycle. As discussed in connection with the flow chart of FIG. 1, the schedule button 238 enables the displayed set of replicated events to be committed to the calendar so as to establish a future cycle. If the representative wishes to return to the source view 200, a back button 240 can be provided.

Referring now to FIGS. 1 and 2B, a decision is made whether to split the target date range at block 125, for example, using radio buttons 242 provided in the user interface or as a result of an automated program. Choosing the split option causes events in the source range to be replicated on a future date free of conflict with any previously scheduled events included within the target date range. By way of example, conflicting events may be holidays, vacation time, meetings and conferences, or any event where a normal call schedule would not be possible.

In the target view of FIG. 2B, the "Maintain Day of Week" option is selected and suppresses the split feature. As a result, the source date range is replicated faithfully, across a corresponding target date range. Consequently, the replicated events will augment entries 244 concerning holidays or any personal entries. As discussed below, tests can be taken to address any true time conflicts based on existing events in the target range. In this target window and those of FIGS. 2C through 2E, the user can edit the results by interacting with the entries using a pointer device and the like through the user interface. The edits can, on an individual event basis, remove or modify the details of any proposed event. For discussion purposes, the appointments shown on Thursday and Friday, September 23 and 24 in FIG. 2B, are shown as being "included" in the calendar schedule. However, in a preferred embodiment, the default is to exclude an event that occurs on conflicting dates, such as holidays, and the user manually includes the events in order to achieve the state shown in FIG. 2B.

On the other hand, when the split feature is enabled, the source range can be split in two ways, as indicated at block 130. The first option is to split the source date range by replicating the events that are to occur on the first conflicted day, to the first available day following the target date range, that is, to the first date outside of and beyond the target range. The events that occur on the second conflicted day are rescheduled to the next available day, and the process is repeated until all of the conflicted days have been rescheduled. This result in splitting a source range of one week over multiple weeks, and so on. Thus, with reference to FIG. 2C, the target date range is the same as in FIG. 2B, except now the scheduling method is selected to be "Split Schedule" by having selecting the corresponding radio button 242. This selection can drive the determination made at blocks 125 and 130. Because the target date range includes two days with conflicting events, in this case a two-day holiday, the events from Thursday and Friday of the source date range are shifted to the following Monday and Tuesday, respectively, on the first week following the target date range.

Figure 2C:
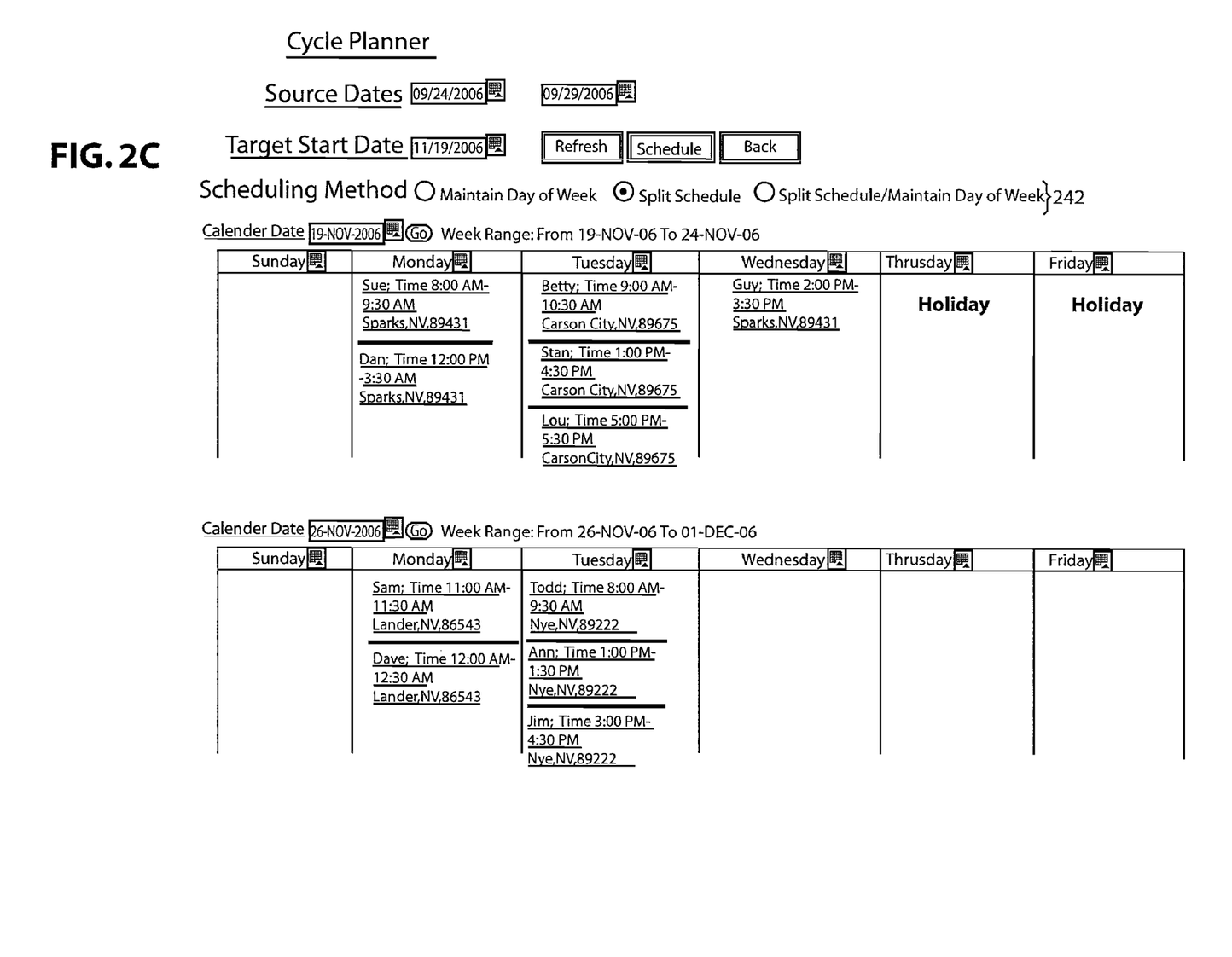
FIG. 2C is a sample two-week view of a user calendar after cycle planning using the "Split Schedule" option, displayed through the user interface of the machine.
Figure 2D:
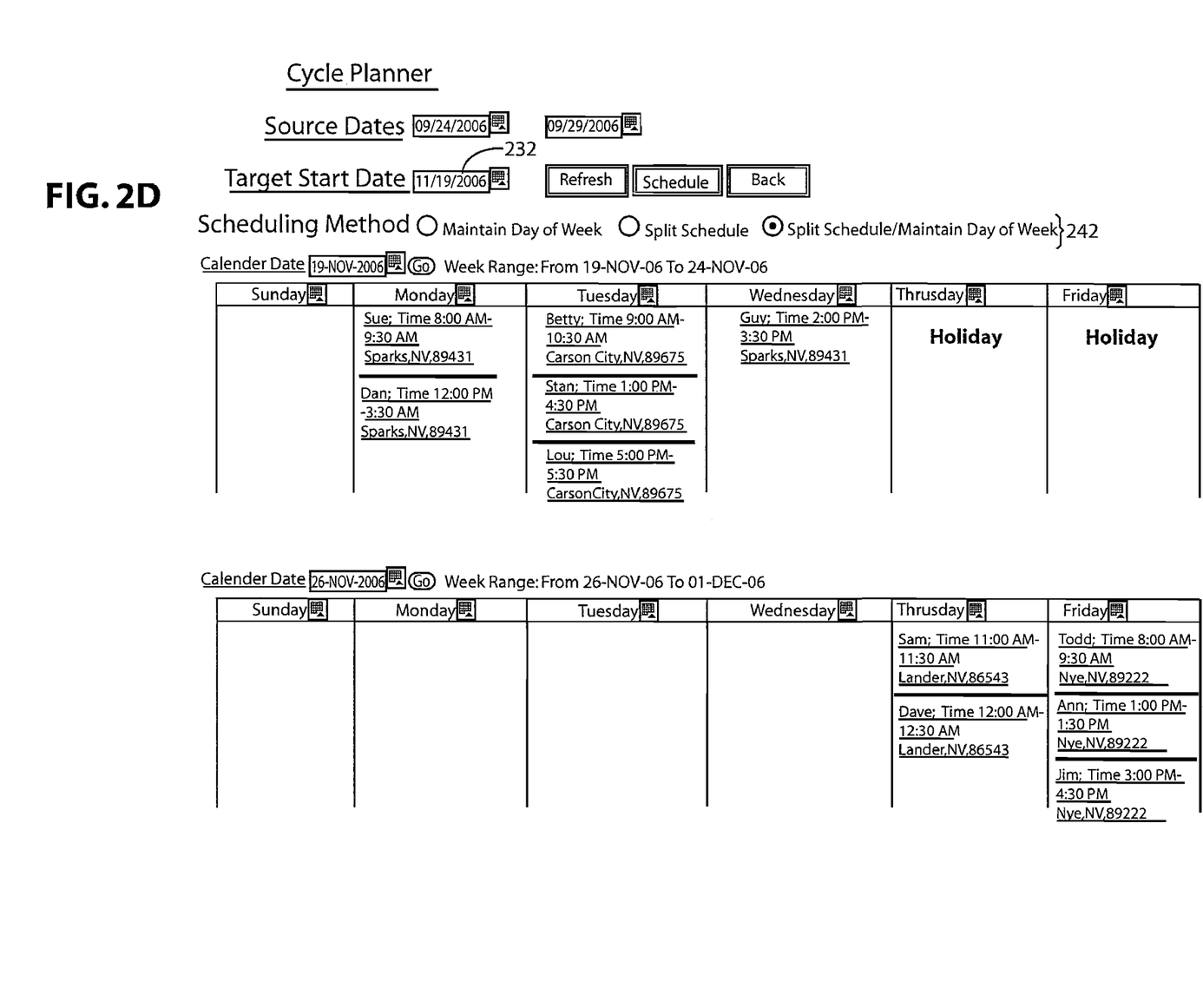
FIG. 2D is a sample two-week view of a user calendar after cycle planning using the "Split/Maintain Day of Week" option, displayed through the user interface of the machine.

In the second option, the source date range is split by replicating the events that are to occur on the first conflicted day, to the first available day following the target date range that falls on the same day of the week. This action also results in splitting the source range into multiple weeks, as is shown in FIG. 2D. In this example, the events from Thursday and Friday of the source range are assigned to a Thursday and Friday, respectively, except that this assignment is outside of the designated target range defined by the entries in text box 232.

In the event of a split schedule, dates can be assigned outside of the target date range, and those dates can be compressed into existing calendar dates that already contain calendar entries. Dates falling outside of the target range can be handled in this way regardless of whether the split function seeks to maintain the day of the week when assigning events to the next available day. Optionally, if the target date outside of the range turns out to be a holiday, the algorithm can be repeated so as to exclude holidays from being eligible to receive calendar entries.

In the illustrated examples, the events within the conflicted days were assigned to the first available day following the target date range. In an alternate embodiment, the user can be prompted to specify the day or days onto which the events within the conflicted days are to be split. After selecting a splitting method at block 130, the target cycle is generated at block 135, and the user is presented with a display of the results at block 140, as shown in FIGS. 2B, 2C and 2D.

Figure 2E:
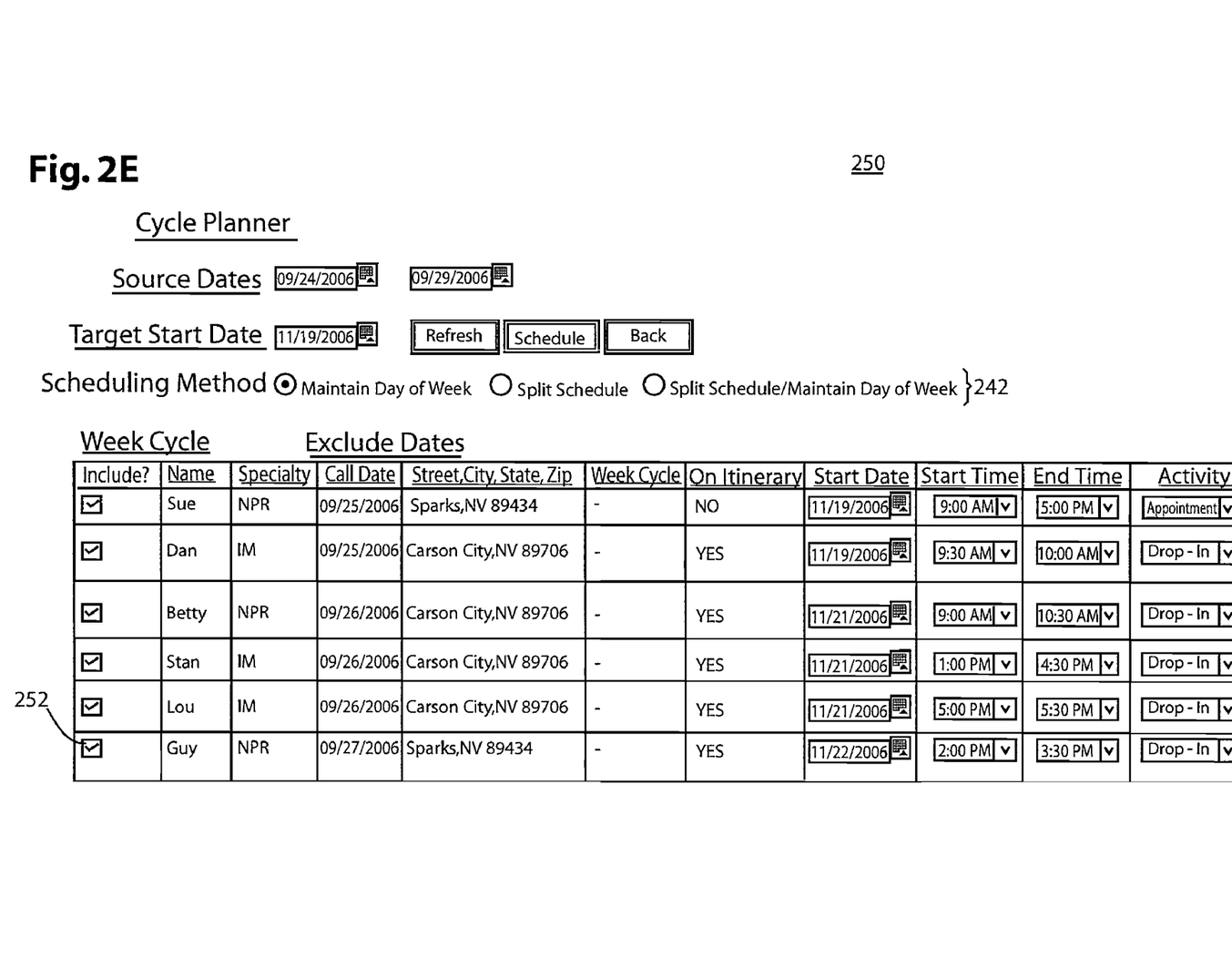
FIG. 2E is a sample cycle-plan editing view, presented through the user interface of the machine.

FIG. 2E presents a proposed cycle plan in a table format. The cycle planning window 250 provides another presentation of a proposed cycle plan which the user can edit, as indicated at block 145. The tabular listing of events can include call note information from the local database such as the customer name, customer specialty, previous sales call date and the customer address. The user can also be presented with the proposed target date for each event, the start time for the event and the end time for the event. The user can also be presented with a drop-down menu to select a type of activity, such as a scheduled appointment or a drop-in. The default setting in the target range can be "drop in" in view of the fact that the appointment may have been replicated for the representative. However, if the appointment already existed on that target date, it likely is an activity type "appointment."

During the edit at block 145 the user can be offered additional options such as the option to exclude any particular event by interacting with a check box 252. Using various controls provided in the user interface window 250, the user can manually change any appointment date, the start time or the end time, or the activity category. The user can refresh the schedule using no splitting method or a different splitting method, via buttons 242 and 232.

Once the user is satisfied with the cycle plan they have the opportunity to commit the plan to the database at block 150, for example, by interacting with the control 238. This function updates the local database of the representative's machine to reflect the displayed state of the cycle plan in window 230, 250. The process then ends, as indicated by the termination block, so that the representative can take other actions using the territory management software.

Referring again to FIGS. 1 and 2B, if the decision block at 125 determines that the target range is not to be split, the database is searched for any existing events that may fall within the target date range, at block 155. If the search fails to identify and schedule events within the targeted date range, the target cycle is generated at block 135, as 20 described above. If, however, the database search identifies one or more scheduled events already included in the local database within the target date range, as tested at block 160, the user is alerted to the conflict, at block 165. The user is then queried as to whether to proceed or edit the target date range. If the user chooses to proceed, the target cycle is generated at block 135 and the process proceeds as described already. However, 25 if the user chooses not to proceed, the process flow returns to block 120 to permit the representative to define the target range or scheduling method with different parameters.

The cycle planning tool can perform its functions with minimal user interaction, allowing for the rapid creation of a schedule of events. After choosing to cycle plan at block 105 in FIG. 1 by selecting the cycle plan button 220 in FIG. 2A, source dates are captured from the display screen and the scheduled events are identified at block 115. The user is then presented with target view 230 (shown in FIG. 2B), at which point the target date range is obtained by the user inputting the target start date into text box 232. By selecting the schedule button 238, the user accepts any default setting for splitting the target date range, as indicated at block 125. Default settings can be selected for use identifying the target date range. The user also can select default settings at block 160 and 170, but no further action is required by the user until after the target cycle has been generated, at block 135.

In a variation of the foregoing, the user can pre-select or establish a setting in which all default settings are accepted. In this manner, a cycle plan can be established and committed to the database (i.e., block 150) once the target date range has been input at block 120, without any intervening action by the user. This allows the replication of multiple scheduled events by assigning all or a portion of a set of previously scheduled events to a new target date range in response to the single act of defining one end of a target date range Referring now to FIG. 3, a flow diagram illustrates another process flow in accordance with the present invention which relates to planning a schedule of events based on one or more user-selected criterion, that are matched against the local database at the representative's machine.

Figure 3:
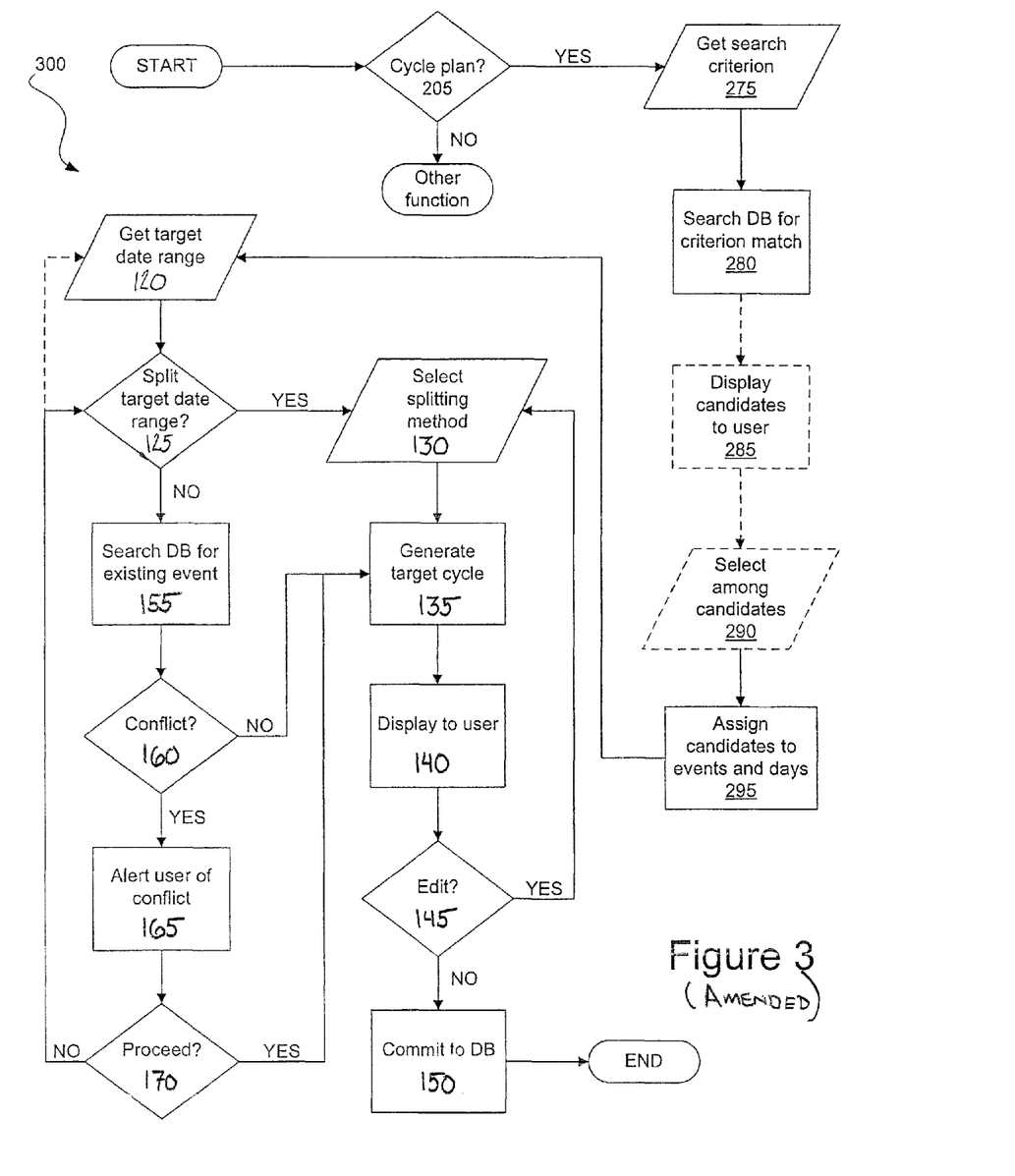
FIG. 3 is a flow diagram illustrating certain steps in accordance with another embodiment of the present invention.
Figure 4:
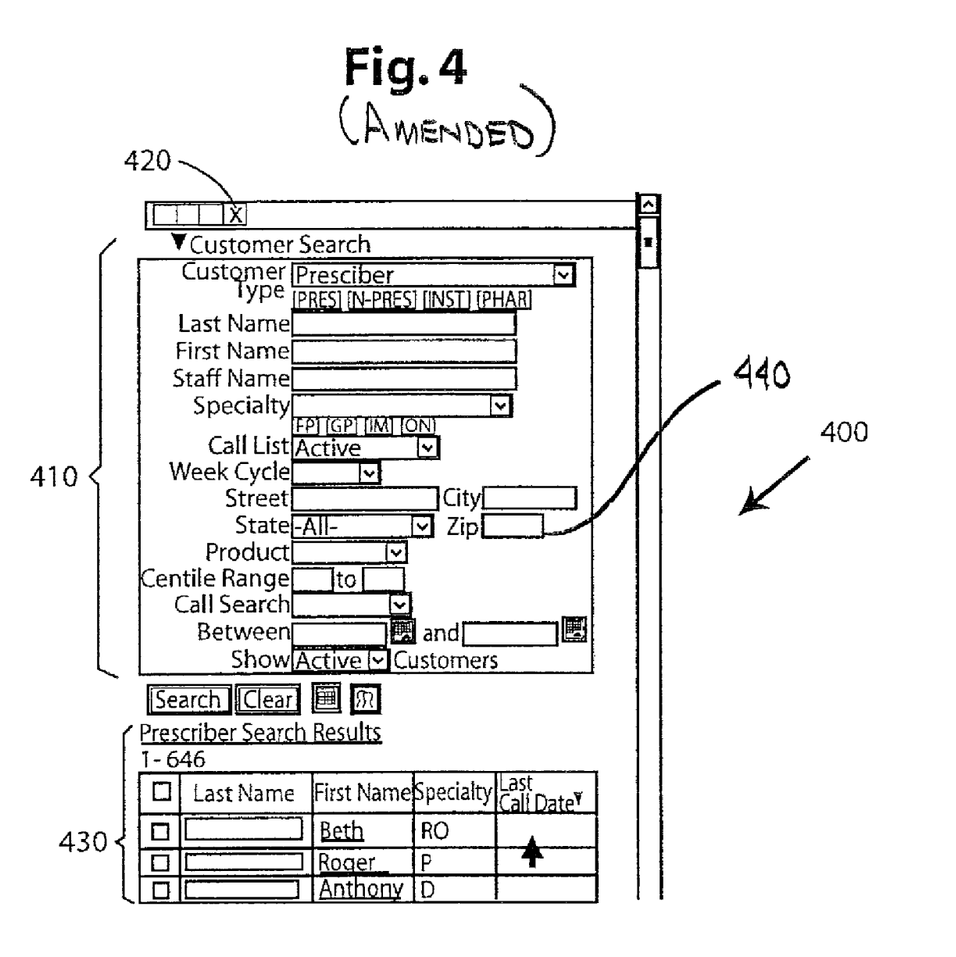
FIG. 4 is a sample search form which is suitable for inputting one or more criteria for identifying candidates for a future cycle plan.

At block 205, the user initiates the cycle plan function through the user interface, such as by selecting the Itinerary/schedule tab 214 from source window 200. In this example, the field representative creates a cycle plan based on criteria that will be searched in a database stored on the machine. The criteria may include geographic data, the time since the last sales call or prescriber data (such as the number of prescriptions written by the prescriber in a certain time period or the prescriber with the highest or lowest number of prescriptions written in a certain time period or the prescriber with the biggest change in prescriptions written within a certain time period). Preferably, a search tool is displayed to assist in the user in inputting criteria and organizing the cycle plan criteria. For example, the search window 400 can be displayed (until closed or hidden using control 420) through the interface for this purpose, and can include various search fields, as shown in region 410, as well as other fields suitable for querying the database for any information therein, including the various criteria described herein. Results of any search can be shown in tabular form, like the table in view 250 or in a region 430 of the search window.

At block 275 the user is prompted for the search criteria. In one embodiment, the criteria is entered by completing a search region 410. In another embodiment, the criteria is entered by selecting one or more predetermined criteria from a series of drop-down menus or selection lists. A hybrid approach can be used as well, in which the search window includes selection lists or menus. For example, a user may select search criteria designed to identify the prescriber with the largest change in prescribing habits within a certain U.S. Zip Code (box 440). Alternatively, the field representative may select search criteria designed to identify the newest health care providers ("HCPs") within a certain city, such as Reno, Nev.

The database is searched for criterion matches at block 280 within the representative's territory, and the identified candidates are assigned as proposed events, in this case sales calls, at block 295. The candidates identified in the database search by a criterion match can be displayed to the user, through the user interface for selection by the user prior to assignment to any event as indicated at blocks 285 and 290, respectively.

Either before or after events have been identified, the user must be prompted for a target date range, as indicated at block 120. Once candidate visits have been identified and a target range proposed, the process can then proceed as depicted starting at block 120 in FIG. 1, shown in FIG. 3 with corresponding reference numerals. The assignment of a calendar timeslot for the event also can be made automatically by accessing a database of customer preferences. In this manner, a candidate match from 280 can be assigned as an event at 295 in which the start time and day-of-the-week are determined from querying a database of stored customer preferences. In one embodiment, the customer preferences are stored on the user's machine in association with each customer (e.g. Dr. Jane prefers 8:30 to 9:30 MWF). In another embodiment the customer preferences are accessed from a central database.

Optionally, the user interface can include a selectable link that can provide the representative with access to a central database where customer data is stored. This data may include by way or example, but not limited to, customer contact information, customer preferences for scheduling sales calls, customer use data such as a physicians prescribing habits, changes in customer use data such as largest increase or decrease in prescriptions written.

With further regard to the process of FIG. 3, the candidate events can be defined through the criteria provided on the basis of a geographic preferences. For example, the field representative can cycle plan by first selecting geographic regions and then assigning them to a particular day. The geographic regions may be assigned based on any number of criteria, including City, State, County, United States Zip Code or any zone-based system, by way of example. Such "itinerary planning" enables a later cycle to be based on prior visits within the identified geographic region. Alternatively, the selection of geographic criteria can present search results 430 which can be selected for inclusion or exclusion into the future cycle by interacting with controls such as check boxes 252 (FIG. 2E).

Customer preferences that are collected by the field representative are uploaded to the central computer over a suitable communication link. During that same communication or in a separate communication session, the central computer can download to the user's machine information that is designated for receipt by the representative, including, in relevant part, any customer information that has been imported or otherwise provided to the central database server software. The data exchange is over a communication link between the central computer and the remote machine of the representative. In the event that the representative's machine includes wireless network capabilities (e.g., a broadband card that can connect the machine through a "hot spot"), the upload can occur whenever the system detects that it has secure network connectivity, and this process can be performed as a background thread while the user performs other tasks on the machine running the Territory Management System software. The data exchange can be conducted in accordance with the following applications: U.S. Provisional Application Ser. No. 60/867,943, filed on Nov. 30, 2006, entitled "Data Cache Techniques In Support Of Synchronization of Databases In A Distributed Environment," and U.S. Provisional Application Ser. No. 60/867,945, filed on Nov. 30, 2006, entitled "Software, Systems and Methodologies For Realignment of Remote Databases By A Central Database In Support of Field Representative Territory Assignments," which are each hereby incorporated by reference in their respective entireties.

While the cycle planning tool described herein incorporates capabilities for interacting with a central server, the cycle planning tool preferably executes on a user's machine free of any connection or reliance on data including calendars maintained on remote machines. Thus, the cycle planning tool allows the user to establish a call schedule using data only contained on the user's machine, without the need for accessing a central server. By selecting a range of prior sales calls from a calendar schedule, which exist only on the machine of the sales representative, the sales representative can create a schedule of future sales calls by selecting a target date, or range of dates, within which they are to be applied. This function is performed independent of (i.e., without obtaining) any permission from a central server, and independent of (i.e., without) having knowledge of customer availability.

In the foregoing description, certain flow diagrams have been shown and processes described in relation to those flow diagrams which provide a reference for discussion purposes. In an actual implementation of the methods of the present invention, the steps can comprise event-driven routines that can run in parallel and can be launched and executed other than as shown by the simple depiction in the flow diagrams. For example, a number of edits can be made or obtained at block 145 through the user interface before any target cycle is generated at block 135. In short, the particular order of the steps in the flow diagrams is illustrative of the invention, but not limiting of the various permutations that can be achieved in a given embodiment. Accordingly, it is the performance of the steps recited in the claims appended below which is pertinent, and not the order of operation of the steps themselves.

We claim:

1. A computer-assisted method for electronically creating a schedule plan of events for a representative by replicating one or more previously scheduled events, comprising the steps of:
    acquiring a source date range into a memory of a machine comprising at least two dates spanning at least two calendar days;
    identifying a set of previously scheduled events within the source date range within the memory of the machine;
    receiving a target date range input through a user interface;
    testing the target date range for a conflict with any of the previously schedule events using a process executing in the machine;
    assigning within the received target date range at least a first portion of the set of previously scheduled events to create the schedule plan on calendar dates that tested as having an absence of the conflict;
    augmenting the schedule plan by assigning to two or more calendar dates that are outside of the received target date range a second portion of the one or more previously scheduled events, wherein the previously scheduled events in the second portion occur on respective different calendar dates, wherein each of the previously scheduled events in the second portion tested as having the conflict, and wherein the assignment of the previously scheduled events in the second portion is to respective calendar dates outside of the received target date range that neither immediately precede nor succeed the conflict; and
    posting the schedule plan to a calendar maintained by the machine.

2. The method of claim 1, wherein the one or more previously scheduled events in the second portion is associated with a respective day-of-the-week value and wherein the augmenting step assigns the date outside of the received target date ranges so as to schedule the second portion of events on a corresponding day of the week.

3. The method of claim 1, wherein the assigned portion of the one or more previously scheduled events includes at least one event in the source date range having a day-of-the-week value, wherein the assigned date within the target date range maintains the day-of-the-week value.

4. The method of claim 1, wherein the identifying step comprises retrieving an entry from the calendar.

5. The method of claim 1, wherein the received target date range comprises at least one end of a date range, and wherein the assigning step is performed in a single action.

6. A computer-assisted method for electronically creating a schedule plan of events for a representative, comprising the steps of:
    acquiring one or more search criteria into a memory of a machine;
    receiving a target date range comprising at least two dates spanning at least two calendar days input through a user interface, the target date range including one or more previously scheduled events of the representative;
    executing a search of a database on the machine to identify at least one criterion match;
    testing the matches from the search for a conflict with any previously scheduled events using a process executing in the machine;
    assigning in the memory at least a first portion of the matches to a time slot in a date within the received target date range that tested as having an absence of the conflict;
    in the event of a conflict with any of the previously scheduled events, augmenting the schedule plan by assigning to two or more calendar dates that are outside of the received target date range a second portion of the one or more previously scheduled events, wherein the previously scheduled events in the second portion occur on respective different calendar dates, wherein each of the previously scheduled events in the second portion tested as having the conflict, and wherein the assignment of the previously scheduled events in the second portion is to respective calendar dates outside of the received target date range that neither immediately precede nor succeed the conflict; and
    populating the target date range of a calendar program with the memory assignments.

7. The method of claim 6, including the additional step of selecting one or more candidates, and wherein the matches include the selected candidates.

8. The method of claim 7, including the additional step, prior to the selecting step, of displaying through the user interface of the machine, the candidates and criterion matches.

9. The method of claim 6, wherein the assigning step further comprises assigning in the memory at least a portion of the matches to a time slot in a date within the received target date range based on customer preference.

10. The method of claim 9, wherein the customer preferences are stored in a database on the user's machine.

11. The method of claim 9, wherein the customer preferences are stored in a database on a central server.

12. A computer-assisted method for electronically creating a schedule plan of events for a representative, comprising the steps of:
    acquiring one or more search criteria and a source date range comprising at least two dates spanning at least two calendar days for entry into a memory of a machine through a user interface;
    receiving a target date range input through the user interface, the target date range including one or more previously scheduled events of the representative;
    executing a search of a database on the machine to identify at least one criterion match occurring in the source date range;
    testing the matches from the search for a conflict with any previously scheduled events using a process executing in the machine
    assigning in the memory at least a first portion of the matches to a time slot in a date within the received target date range that tested as having an absence of the conflict;
    in the event of a conflict with any of the previously scheduled events, augmenting the schedule plan by assigning to two or more calendar dates that are outside of the received target date range a second portion of the one or more previously scheduled events, wherein the previously scheduled events in the second portion occur on respective different calendar dates, wherein each of the previously scheduled events in the second portion tested as having the conflict, and wherein the assignment of the previously scheduled events in the second portion is to respective calendar dates outside of the received target date range that neither immediately precede nor succeed the conflict; and
    populating the target date range of a calendar program with the memory assignments.

13. The method of claim 12, including the additional step of selecting one or more candidates, and wherein the matches include the selected candidates.

14. The method of claim 13, including the additional step, prior to the selecting step, of displaying through the user interface of the machine, the candidates and criterion matches.

15. The method of claim 12, wherein the assigning step further comprises assigning in the memory at least a portion of the matches to a time slot in a date within the received target date range based on customer preference.

16. The method of claim 15, wherein the customer preferences are stored in a database on the user's machine.

17. The method of claim 15, wherein the customer preferences are stored in a database on a central server.

* * * * *